Patented June 11, 1946

2,402,103

UNITED STATES PATENT OFFICE 2,402,103

PRODUCTION OF CHROMIUM COMPOUNDS

Marvin J. Udy, Niagara Falls, N. Y.

No Drawing. Application March 19, 1942,
Serial No. 435,438

6 Claims. (Cl. 23—56)

This invention relates to the production of hexavalent chromium compounds and has for an object the provision of improved methods of extracting hexavalent chromium from crude materials containing chromium in the hexavalent state combined with oxygen and a base in the form of chromate. More particularly, the invention contemplates the provision of improved methods of extracting hexavalent chromium from crude materials containing chromium in the form of calcium chromate. The invention further contemplates the provision of improved methods of producing calcium chromate and sodium dichromate.

Chromate for industrial uses is prepared and marketed largely as sodium dichromate. The chromate is produced initially as sodium chromate but conversion to the dichromate is desirable because of difficulties involved in obtaining a suitable solid sodium chromate product for marketing. Chromate in the form of calcium chromate would be desirable if calcium chromate could be produced and recovered directly from crude chromium-bearing materials at a recovery cost of the order of the cost of recovering sodium chromate, since calcium chromate contains relatively cheap lime (CaO) as the basic constituent, whereas sodium chromate contains relatively expensive sodium oxide as the basic constituent, and calcium chromate can be crystallized in the form of desirable solid products. No commercially satisfactory procedure for producing and recovering calcium chromate has been proposed by others heretofore. Accepted commercial practices for producing both calcium chromate and sodium dichromate involve the use of sodium chromate as the source of chromate radical.

These procedures have been adopted because sodium chromate can be produced readily by direct oxidation of chromium-bearing materials, and, being very soluble in water, it can be separated readily from solid impurities, whereas, sodium dichromate can not be produced readily by direct oxidation of chromium-bearing materials, and calcium chromate, being relatively slightly soluble in water, is difficult to separate from solid impurities. Both procedures result in the wasting of sodium oxide of the sodium chromate. The production and marketing of chromate as sodium dichromate rather than as calcium chromate is explained by the fact that in the production of sodium dichromate one-half of the sodium oxide of the sodium chromate is utilized, only one-half being wasted, and no additional base is required, whereas, in the production of calcium chromate, all of the sodium oxide of the sodium chromate is wasted and additional base in the form of lime (CaO) in amount equivalent to the sodium oxide of the sodium chromate must be provided.

Calcium chromate can be produced quite readily by roasting chromium-bearing materials such as ferrochromium, oxidized ferrochromium and chromite ore in the presence of lime or in the presence of lime and a small amount of an oxidation promoter such as soda ash. Its recovery from products obtained in such roasting operations is rather difficult and expensive because of its relatively low solubility in water. Therefore, calcium chromate is produced, according to some present practices, by first producing sodium chromate and thereafter treating the sodium chromate in aqueous solution with a soluble calcium compound to form the relatively insoluble calcium chromate which is recovered by evaporation and crystallization.

Procedures involving the production of calcium chromate by first producing sodium chromate may be wasteful of reagents. The production of the sodium chromate involves roasting of chromium-bearing material with air in the presence of a sufficient amount of a sodium compound such as sodium carbonate to form sodium chromate with all of the chromium of the chromium-bearing material. The conversion of all of the chromium to sodium chromate may require the use of a substantial excess of the sodium compound which excess may be wasted, or it may be recovered at considerable expense. Conversion of the sodium chromate to calcium chromate by treatment of the sodium chromate in aqueous solution with a soluble calcium compound results in the production of a sodium compound of the type of soluble calcium compound employed, and the sodium compound thus formed is practically worthless commercially. Thus, for example, sodium carbonate may be employed in the roasting operation to produce chromate. Any excess sodium carbonate employed at this point is wasted as a result of combining with one or more components of the chromium-bearing material to form insoluble compounds. The sodium chromate solution, after concentration, may be treated with calcium chloride to form calcium chromate in accordance with the following equation:

$$Na_2CrO_4 + CaCl_2 \rightarrow CaCrO_4 + 2NaCl$$

The sodium chromate and calcium chloride react to form the relatively slightly soluble calcium chromate. The chromium of the sodium chromate can be obtained largely as calcium chromate by repeated evaporation and crystallization treatments. The sodium chloride produced is wasted because the commercial value of sodium chloride is so low that its recovery in a suitably pure commercial form would not be economical. Thus, the process results in a substantially complete loss of the sodium compound employed in the initial roasting treatment.

When sodium dichromate ($Na_2Cr_2O_7$) is to be prepared in accordance with some heretofore customary procedures, chromium-bearing material is roasted as described above to produce sodium chromate ($Na_2CrO_4$), a sodium chromate solution is formed by leaching the roasted material with water, and sodium dichromate is formed by treating the sodium chromate solution with an acid such as sulphuric acid. Sodium chromate and sulphuric acid react to produce sodium dichromate and sodium sulphate as indicated by the following equation:

$$2Na_2CrO_4 + H_2SO_4 \rightarrow Na_2Cr_2O_7 + Na_2SO_4 + H_2O$$

The sodium sulphate and the sodium dichromate may be separated by evaporation and crystallization, the sodium sulphate being wasted.

The present invention provides methods of producing calcium chromate by means of which the loss of relatively expensive sodium compounds may be reduced or avoided.

In accordance with the invention, chromate compounds are recovered in relatively pure forms from crude chromate-bearing materials containing calcium chromate and which may contain, also, an alkali metal chromate such as sodium chromate. A complete process of the invention may include oxidation of chromium-bearing material containing chromium in the elemental state or in the trivalent state under such conditions as to produce the crude chromate-bearing material containing calcium chromate or containing calcium chromate and alkali metal chromate in various proportions.

In carrying out a process of the invention for recovering relatively pure chromate compounds from crude chromate-bearing material containing calcium chromate, the crude chromate-bearing material is digested in the form of a pulp with an aqueous liquid containing in solution an acid or an acid salt capable of reacting with calcium chromate to effect its decomposition and to form a compound of calcium less soluble in water than calcium chromate. The composition of the pulp preferably is so regulated as to effect conversion to dichromate of the chromium of the decomposed calcium chromate. Conversion of the chromium of the decomposed calcium chromate to dichromate is controlled by establishing in the pulp a controlled amount of one or more bases capable of combining with chromate ions to produce one or more soluble dichromate compounds.

The bases employed may be metallic elements or radicals which function as metallic elements in forming chemical compounds. Thus, for example, the bases which are suitable for use in practicing the invention include calcium (Ca), sodium (Na), potassium (K) and the ammonium radical ($NH_4$).

The bases may be employed in the form of any suitable salts or other compounds, that is, in chemical combination with non-metallic elements or with base or acid forming radicals. The compounds containing the bases as constituents may be salts of acids whose acid radicals are capable of combining with calcium to form compounds less soluble in water than calcium chromate or the compounds may be free of constituents capable of combining with calcium to form compounds less soluble in water than calcium chromate. When the compounds containing the bases as constituents are free of constituents capable of combining with calcium to form compounds less soluble in water than calcium chromate, they are employed in conjunction with acids having constituents which are capable of combining with calcium to form compounds less soluble in water than calcium chromate. Thus, for example, the base may be provided in the form of an acid carbonate or acid sulphate which compounds are capable of reacting with calcium chromate to form compounds (calcium carbonate and calcium sulphate) less soluble in water than calcium chromate, or, the base may be provided in the form of a chromate in which case the compound should be employed in conjunction with an acid, such as carbonic acid or sulphuric acid, capable of combining with calcium to form a compound less soluble in water than calcium chromate.

Processes of the invention are based on reactions of the following types:

(1) $2CaCrO_4 + CO_2 + H_2O \rightarrow CaCr_2O_7 + CaCO_3 + H_2O$

In processes employing the above reactions, calcium chromate of the crude calcium chromate-bearing material provides the base for combining with the chromate ions to form the soluble dichromate compound, calcium dichromate, and carbonic acid formed by reaction of carbon dioxide with water provides the acid constituent capable of combining with calcium to form a compound of calcium ($CaCO_3$) less soluble in water than calcium chromate.

(2) $2CaCrO_4 + 2NaHCO_3 \rightarrow Na_2Cr_2O_7 + 2CaCO_3 + H_2O$

In processes employing the above reactions, calcium chromate is decomposed by sodium acid carbonate with the production of highly soluble sodium dichromate and slightly soluble calcium carbonate.

(3) $CaCrO_4 + Na_2CrO_4 + CO_2 + H_2O \rightarrow Na_2Cr_2O_7 + CaCO_3 + H_2O$

In processes employing the above reactions, sodium acid carbonate formed by reaction of carbonic acid with sodium chromate ($2Na_2CrO_4 + H_2CO_3 \rightarrow Na_2Cr_2O_7 + 2NaHCO_3$)

probably forms the active agent for decomposition of the calcium chromate as in Equation 2 above.

Crude calcium chromate-bearing material for treatment in the process of the invention may be obtained from any suitable source. Such material may be produced, for example, by roasting in air ferrochromium or chromite ore in finely divided condition and in the presence of lime to oxidize elemental chromium or trivalent chromium contained therein to the hexavalent state with the production of calcium chromate. The roasting charge may contain an oxidation promoter such as sodium carbonate or other sodium compound in which case sodium chromate may also be formed. The amount of sodium chromate produced in any roasting operation will depend upon the relative quantities of sodium and chromium present in the roasting charge. When sodium dichromate or calcium chromate is the end product sought, roasting charges should be prepared with sodium present in amounts not exceeding that required to form sodium chromate with half of the chromium present and lime should be provided in amounts sufficient to form calcium chromate with the remainder of the chromium.

When sodium dichromate is the end product sought, roasting preferably is so conducted as to form a product containing sodium chromate and calcium chromate in about equi-molecular proportions. The resulting product may be digested in an aqueous pulp with carbon dioxide to convert substantially all of the chromate to sodium dichromate in accordance with the following equation:

(4) $CaCrO_4 + Na_2CrO_4 + CO_2 + H_2O \rightarrow$
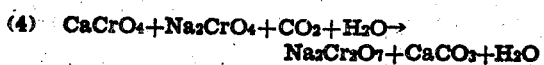
$Na_2Cr_2O_7 + CaCO_3 + H_2O$ The liquid containing in solution the sodium dichromate thus formed may be separated from insoluble material of the roasted charge and evaporated to produce solid sodium dichromate.

When calcium chromate is an end product sought, roasting preferably is conducted in the absence of any sodium compound or in the presence of the minimum amount of sodium compound which will promote effective oxidation of the chromium. If calcium chromate is substantially the only chromate formed in roasting, it may be separated and recovered by digesting the roasting charge in an aqueous pulp with carbon dioxide to produce a solution of calcium dichromate and treating the solution of calcium dichromate with calcium hydroxide to form calcium chromate in accordance with the following equations:

(5) $2CaCrO_4 + CO_2 + H_2O \rightarrow$
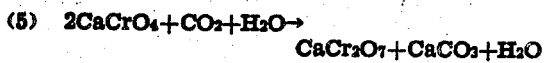
$CaCr_2O_7 + CaCO_3 + H_2O$ (6) $CaCr_2O_7 + Ca(OH)_2 \rightarrow 2CaCrO_4 + H_2O$ The relatively insoluble calcium chromate thus formed may be precipitated by boiling or evaporating the solution. Anhydrous calcium chromate may be precipitated from solution by heating the solution to a temperature of about 180° C. or higher under pressure of about 150 pounds per square inch or higher.

When some sodium chromate is formed in operations designed for the production of calcium chromate, the roasted charge may be digested directly with carbon dioxide and water with the production of a mixture of sodium dichromate and calcium dichromate; it may be leached first with water to remove the soluble sodium chromate and then digested with water and carbon dioxide to produce calcium dichromate; or it may be digested with carbon dioxide and a solution of sodium chromate to produce a solution of sodium dichromate. The solution of sodium dichromate may be treated with calcium hydroxide to form calcium chromate and sodium chromate in accordance with the following equation:

(7) $Na_2Cr_2O_7 + Ca(OH)_2 \rightarrow$
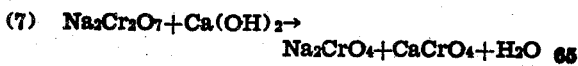
$Na_2CrO_4 + CaCrO_4 + H_2O$

The calcium chromate thus formed may be precipitated from solution in the hydrated state or the anhydrous state, and the solution of sodium chromate may be separated from the precipitate and used for leaching additional calcium chromate-bearing material. A solution of calcium dichromate may be treated with calcium hydroxide as described above to produce calcium chromate. A solution containing calcium dichromate and sodium dichromate may also be treated with calcium hydroxide as described above to form calcium chromate and sodium chromate. Sodium chromate thus formed may be separated from the calcium chromate and recovered as such or converted to sodium dichromate or it may be used in conjunction with carbon dioxide to treat additional calcium chromate-bearing material. When sodium chromate solution is employed to treat calcium chromate-bearing material containing sodium chromate, it is advisable to bleed from the leach solution containing sodium dichromate an amount of sodium dichromate equivalent to the sodium chromate contained in the calcium chromate bearing material to be treated before returning it to the process.

When carbon dioxide and water are employed to digest calcium chromate-bearing material in order to produce calcium dichromate, digestion preferably is carried out under pressure and at an elevated temperature. Grinding of the calcium chromate-bearing material during digestion may be carried out advantageously. Grinding prevents accumulation of precipitated calcium carbonate on the surfaces of particles of calcium chromate with resulting reduction in the rate of solution of the calcium chromate. Pressures of 40 pounds per square inch and higher may be employed advantageously. An elevated temperature of about 70° C. or higher prevents the formation and solution of calcium bicarbonate ($CaH_2(CO_3)_2$), which forms at lower temperatures but which decomposes at temperatures above about 70° C. Digestion may be carried out at lower temperatures and the solution containing calcium dichromate and calcium bicarbonate may be heated after separation from the solid material to decompose the calcium bicarbonate. Calcium carbonate produced by decomposition of the calcium bicarbonate may be separated from the calcium dichromate solution by filtering.

When sodium chromate is employed in conjunction with carbon dioxide and water for leaching calcium chromate-bearing material, lower pressures and temperatures may be employed satisfactorily. The reactions take place rapidly at atmospheric pressure.

I claim:

1. The method of recovering chromium from chromium-bearing material which comprises subjecting the material to an oxidizing treatment in the presence of lime and soda ash to form an oxidized product containing calcium chromate and sodium chromate, digesting the oxidized product in the form of a pulp with an aqueous liquid containing in solution sodium chromate and carbon dioxide to decompose calcium chromate and form sodium dichromate and insoluble calcium carbonate, the composition of the pulp being so regulated as to effect conversion to sodium dichromate of a substantial amount of the chromium of the decomposed calcium chromate, separating a sodium dichromate solution from insoluble material of the oxidized product, treating the sodium dichromate solution with a calcium compound under pressure at a temperature not lower than about 180° C. to form a solution of sodium chromate and precipitate anhydrous calcium chromate, separating the solution of sodium chromate and the anhydrous calcium chromate precipitate, and utilizing the solution of sodium chromate in the digestion of additional calcium chromate-bearing material.

2. The method of recovering chromium from chromite ore which comprises subjecting the ore to an oxidizing treatment in the presence of lime and soda ash to form an oxidized product containing calcium chromate and sodium chromate, digesting the oxidized product in the form of a pulp with an aqueous liquid containing in solution sodium chromate and carbon dioxide to decompose calcium chromate and form sodium dichromate and insoluble calcium carbonate, the composition of the pulp being so regulated as to effect conversion to sodium dichromate of a substantial amount of the chromium of the decomposed calcium chromate, separating a sodium dichromate solution from insoluble material of the oxidized product, treating the sodium dichromate solution with a calcium compound under pressure at a temperature not lower than about 180° C. to form a solution of sodium chromate and precipitate anhydrous calcium chromate, separating the solution of sodium chromate and the anhydrous calcium chromate precipitate, and utilizing the solution of sodium chromate in the digestion of additional calcium chromate-bearing material.

3. The method of recovering chromium from ferrochromium which comprises subjecting the ferrochromium in finely divided form to an oxidizing treatment in the presence of lime and soda ash to form an oxidized product containing calcium chromate and sodium chromate, digesting the oxidized product in the form of a pulp with an aqueous liquid containing in solution sodium chromate and carbon dioxide to decompose calcium chromate and form sodium dichromate and insoluble calcium carbonate, the composition of the pulp being so regulated as to effect conversion to sodium dichromate of a substantial amount of the chromium of the decomposed calcium chromate, separating a sodium dichromate solution from insoluble material of the oxidized product, treating the sodium dichromate solution with a calcium compound under pressure at a temperature not lower than about 180° C. to form a solution of sodium chromate and precipitate anhydrous calcium chromate, separating the solution of sodium chromate and the anhydrous calcium chromate precipitate, and utilizing the solution of sodium chromate in the digestion of additional calcium chromate-bearing material.

4. The method of producing anhydrous calcium chromate which comprises treating an aqueous solution containing sodium dichromate with calcium hydroxide, heating the solution to a temperature not lower than about 180° C., under pressure to form and precipitate anhydrous calcium chromate, and separating the anhydrous calcium chromate from the accompanying liquid.

5. The method of producing anhydrous calcium chromate which comprises treating an aqueous solution containing calcium dichromate with calcium hydroxide, heating the solution to a temperature not lower than about 180° C. under pressure to form and precipitate anhydrous calcium chromate, and separating the anhydrous calcium chromate from the accompanying liquid.

6. The method of producing anhydrous calcium chromate which comprises treating an aqueous solution containing a dichromate of the group consisting of sodium dichromate and calcium dichromate with calcium hydroxide, heating the solution to a temperature not lower than about 180° C. under pressure to form and precipitate anhydrous calcium chromate, and separating the anhydrous calcium chromate from the accompanying liquid.

MARVIN J. UDY.